(12) United States Patent
Guillen et al.

(10) Patent No.: US 6,575,646 B1
(45) Date of Patent: Jun. 10, 2003

(54) PRINTER CARRIAGE BUSHING

(75) Inventors: Roberto Guillen, Barcelona (ES); Emilio Angulo, Barcelona (ES)

(73) Assignee: Hewlett-Packard Company, Palo Alto, CA (US)

( * ) Notice: Subject to any disclaimer, the term of this patent is extended or adjusted under 35 U.S.C. 154(b) by 0 days.

(21) Appl. No.: 09/429,436

(22) Filed: Oct. 28, 1999

(30) Foreign Application Priority Data

Oct. 29, 1998  (EP) ............................................ 98120425

(51) Int. Cl.⁷ ................................................ B41J 11/22
(52) U.S. Cl. ...................................... 400/354; 400/352
(58) Field of Search ............................. 400/354, 354.1, 400/354.2, 352

(56) References Cited

U.S. PATENT DOCUMENTS

| 4,468,144 A | 8/1984 | McMahon et al. ........... 400/354 |
| 4,756,630 A | 7/1988 | Teeslink ....................... 384/30 |
| 5,332,321 A | 7/1994 | Beauchamp et al. ........ 400/354 |
| 5,346,320 A | 9/1994 | Nguyen ....................... 400/354 |
| 5,348,404 A * | 9/1994 | Movaghar et al. .......... 400/354 |
| 5,366,305 A * | 11/1994 | Christianson ............... 400/354 |
| 5,435,650 A | 7/1995 | Emig et al. .................. 384/29 |
| 5,806,985 A | 9/1998 | Emig ........................... 384/42 |

FOREIGN PATENT DOCUMENTS

WO    WO 92/12353    7/1992    ........... F16C/29/04

OTHER PUBLICATIONS

European Search Report for Application No. 98120425.8 dated Mar. 23, 1999.

* cited by examiner

Primary Examiner—Anthony H. Nguyen

(57) ABSTRACT

A printer carriage has a bushing liner arranged to slide on a rod, the liner including a metal body with plastic inserts having, on their inside surfaces, ribs, which constitute the bearings of the bushing liner. The inserts are located in grooves of the metallic body by means of an injection moulding process. The external surface of the bushing liner comprises a plurality of flat and curved sections arranged asymmetrically to permit firm and accurate location in an aperture of the carriage.

13 Claims, 4 Drawing Sheets

PRINTER CARRIAGE BUSHING

FIELD OF THE INVENTION

The present invention relates to a printer carriage bushing suitable for use in connection with a large scale plotter carriage which slides back and forth transversely of the print medium.

BACKGROUND OF THE INVENTION

U.S. Pat. No. 5,332,321 discloses bushings of this type and discusses the conflicting design requirements imposed thereon. High tolerance bushing systems require dimensionally stable, i.e. rigid materials, such as metals, but these usually have a high coefficient of friction and are relatively noisy in use. However, bushing systems made of lubricious materials, such as plastics, for reduced friction, tend to be dimensionally unstable, especially with relatively heavy carriages and the associated increased forces applied. This can lead to unwanted movement of the carriage on the rod it is mounted on. Small movements have been noticed that affect print quality by mispositioning the drops on the paper. The reason for this is on the one hand the clearances between the carriage and the bushing and on the other hand the elastic deformation of the bushings as well as the part of the carriage in contact with them.

With increasing size of printer/plotter systems, the physical loads imposed upon the bushings by repeated changes of direction at a high speed increase substantially. In addition the problem of noise becomes an important factor.

U.S. Pat. No. 5,346,320 discloses a bushing liner comprising a moulded mixture of carbon, teflon and nylon.

Both U.S. Pat. No. 5,332,321 and U.S. Pat. No. 5,348,404 disclose bushings constructed of sintered bronze.

The present invention seeks to overcome or reduce one or more of the problems mentioned above.

SUMMARY OF THE INVENTION

According to a first aspect of the present invention, there is provided a printer/plotter apparatus comprising a carriage mounted for sliding movement on at least one rod, the carriage mounting on the or each rod comprising at least one bushing which is of generally part-annular cross-section and which comprises a relatively rigid material, characterised in that the bushing further comprises one or more portions of a relatively lubricious material, at least one of which forms at least part of the internal surface of the bushing.

According to a second aspect of the present invention, there is provided a bushing liner for a printer carriage and having a generally part-annular cross-section, the bushing liner comprising a relatively rigid material, characterised in that the bushing liner further comprises one or more portions of relatively lubricious material, at least one of which forms at least part of the internal surface of the bushing liner.

Advantages of the above bushing are that the relatively rigid parts provide resistance to the effects of high dynamic forces and high precision, and thus a good print quality, whereas the relatively lubricious parts provide low friction and low noise.

In U.S. Pat. No. 5,332,321 the carriage slider rod is directly engaged by flat surfaces of the bushing. Due to unavoidable tolerances, this arrangement tends to produce high wear when it is first put into use, due to the small area of contact existing at that time. This early wear of the bushing provides a corresponding displacement in the position of the carriage leading to the deterioration in performance mentioned above.

Accordingly the present invention also seeks to provide an arrangement in which a controlled area of the bushing contacts the rod throughout its working life.

According to a third aspect of the present invention, there is provided a bushing for sliding on the carriage slider rod of a printer and having a generally part-annular construction wherein the internal surface of the bushing comprises rib means for contacting the slider rod, characterised in that the rib means comprise one or more circumferentially-spaced sets of ribs extending axially of the rod, the or each set comprising two to four relatively closely circumferentially-spaced ribs. Preferably there are two sets each comprising two ribs.

The use of such a small plurality of ribs provides a satisfactory compromise between the requirements of providing a sufficiently large total contact area to avoid unduly rapid wear and at the same time providing sufficiently accurate contact points capable of adequately transferring forces in well-defined directions.

The radially inner surface of the ribs are preferably accurate, corresponding to the diameter of the slider rod to be contacted.

The ribs may be provided on bushings comprising only a single material.

In U.S. Pat. No. 5,332,321 the two positions of contact subtend a right-angle at the centre of the slider rod. For printer carriages involving a more complicated and variable set of loading forces, it has been determined that a modified arrangement is required.

Thus according to a fourth aspect of the present invention, there is provided a bushing for sliding on the carriage slider rod of a printer and having a generally part-annular construction wherein the internal surface of the bushing defines two circumferentially-spaced positions for contact with the rod, characterised in that the positions subtend an angle of between 100° and 165°.

The angle is preferably within the range 110° to 130° and is most preferably substantially 115°.

The bushing may comprise only a single material, and the individual positions of contact may be as disclosed in U.S. Pat. No. 5,332,321.

BRIEF DESCRIPTION OF THE DRAWINGS

Preferred embodiments of the present invention will now be described, by way of example only, with reference to the accompanying drawings, of which.

DETAILED DESCRIPTION OF THE PREFERRED EMBODIMENT

Figure 1:
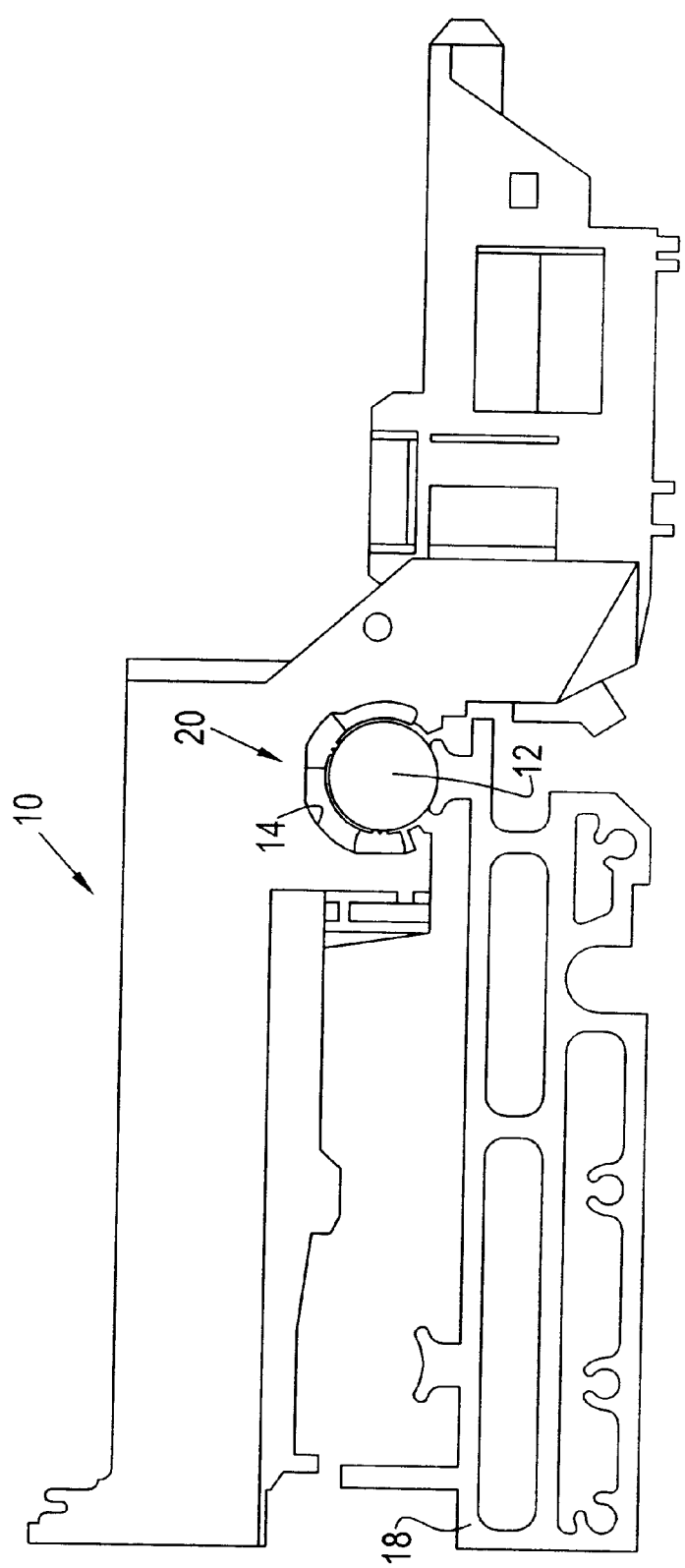
FIG. 1 is a sectional view of a plotter carriage incorporating a bushing in accordance with a first embodiment of the present invention.
Figure 2:
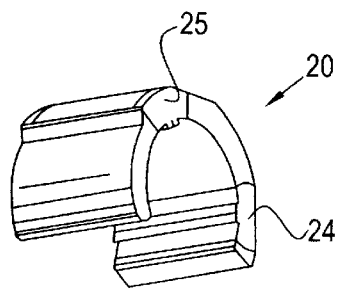
FIG. 2 is an enlarged perspective view of the generally C-shaped bushing liner of FIG. 1.

FIG. 1 shows a printer carriage 10 mounted for sliding movement on a slider rod 12 fixedly attached to a main frame 18 of the printer. The carriage defines an aperture 14 which is arranged to receive a generally part circular or C-shaped bushing liner 20.

Bushing liner 20 comprises a sintered stainless steel body 21 with two machined portions 22, 23 to receive respective inserts 24, 25 of plastics material, which are applied by an injection moulding process. The plastics material is preferably 80% POM (polyoxymethylene or acetal), 10% PTFE and 10% aramid fibre, although the proportions by weight may vary from the values shown.

Figure 4:
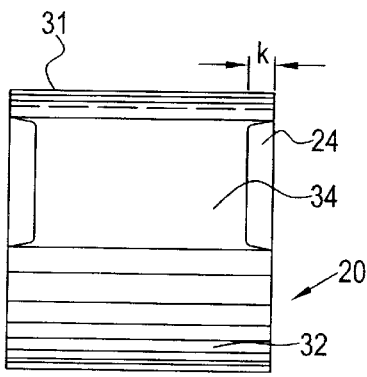
Figure 9:
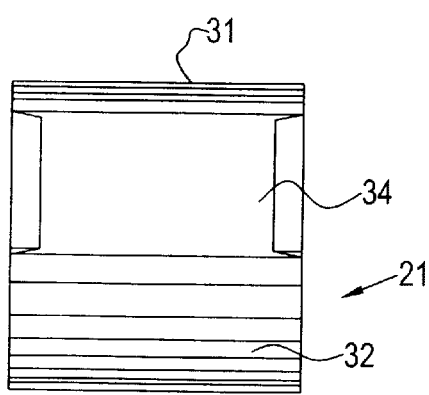
FIGS. 9 and 10 are views corresponding to FIGS. 4 and 5 of the bushing liner without the plastics inserts.
Figure 10:
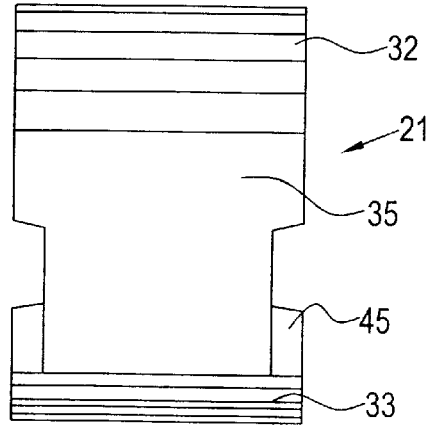
Figure 11:
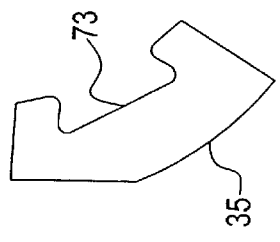
FIGS. 11 and 12 show the respective parts of the bushing liner for receiving the inserts of FIGS. 6 and 7.

The metal body 21 comprises three relatively thick portions 31, 32, 33 which each extend along the entire length "l" of the liner 20. The length "l" is preferably 15 mm. Portion 31 is integrally connected to portion 32 by means of a relatively thin interconnecting web 34. As seen in FIGS. 4 and 9, the web 34 does not extend to the ends of the liner, but is spaced therefrom by a distance "k". This enables the plastics insert 24 to firmly interengage with the web when it is injection-moulded into position.

In similar fashion, portion 32 is integrally connected with portion 33 by means of a web 35 which corresponds with the location of insert 25. The internal surfaces 10 of the portions 31, 32 and 33 form a part circle of uniform radius "r".

Figure 3:
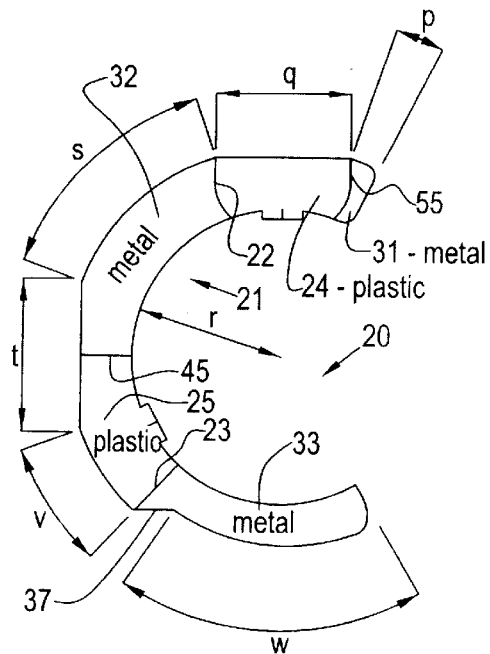
FIGS. 3, 4 and 5 are respectively end, top and rear views of the bushing liner.

To ensure that the liner 20 can be quickly and accurately inserted in carriage aperture 14, its external shape is asymmetric. Thus, as shown in FIGS. 3 and 4, there is a short end section of peripheral extent "p", followed by a straight section of length "q" which extends slightly beyond both ends of web 34. There then follows an arcuate section of arc length "s" which corresponds to a first part of portion 32.

Figure 5:
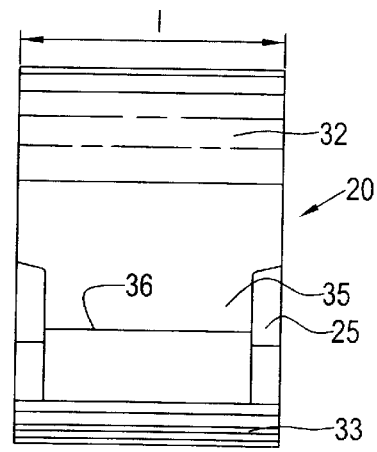

There then follow two straight sections of length "t" and "v" which meet within the web 35, as shown in FIG. 5. Thus web 35 has an angled bend 36 in a central region thereof. The second of these straight sections is connected to a final arcuate section of arc length "w" by means of a sloping shoulder 37 which enables the final section to be of reduced thickness.

The carriage aperture 14 has an internal shape corresponding to the external shape of the liner 20, so that there is only one orientation in which the liner will fit into the aperture.

Figure 12:

By virtue of the shape of web 35, insert 25 has the general shape of a truncated wedge, so that straight side surfaces 45 of the liner are sufficient to assist in securing it in place. In addition the radially inner surface of web 35 has a dovetail-shaped recess 73, FIG. 12, to further secure the central region of insert 25, which is of reduced thickness here.

Since insert 24 lies within a straight section of the bushing liner, the liner's side surfaces 55 have a concave shape to assist in retention. As with web 35, web 34 also has a dovetail-shaped recess 74 to further secure insert 24.

Figure 8:
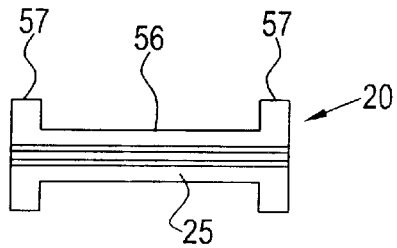
FIG. 8 is a view of one of the inserts seen from inside the C-shape.

As a further aid to retention, the central region of each insert on the inside of the C-shape is of reduced circumferential extent. Thus, as shown in FIG. 8, the inner face of insert 25 has opposed recesses 56 between its ends 57.

The internal surfaces of the inserts 24, 25, form arcs of a circle of a uniform radius which is equal to or slightly less than the radius "r" of the metal portions 31, 32, 33. Thus the inserts lie flush with or protrude slightly beyond the remainder of the internal surface.

The angle subtended at the centre of the circle between lines passing through the centres of the inserts is 115°. The angle between the centre of insert 24 and the nearer end of the C-shape is 27°. The angle between the centre of the insert 25 and the nearer end of the C-shape is 92°. Thus the angle subtended at the centre of the circle between lines to the two ends of the C-shape is 126°.

Located in a generally central region of the internal surface of each insert are two ribs 60, formed integrally with the plastics material of the inserts. The top surfaces 61 of the ribs are arranged to slide in use on the rod 12 and are dimensioned accordingly. In particular, the surfaces 61 are accurate and form arcs of a circle having the same centre and diameter as slider rod 12. The ribs extend radially inwardly beyond the internal surfaces of portions 31, 32 and 33, so that only plastics material comes into contact with rod 12.

Figure 6:
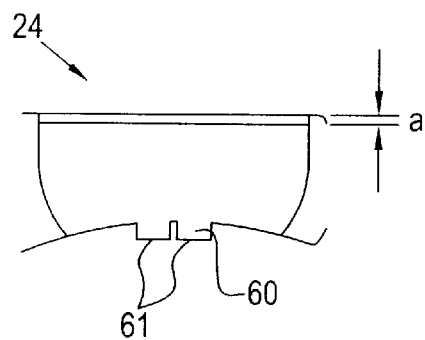
FIGS. 6 and 7 are further enlarged end views of the plastics inserts of the bushing.
Figure 7:
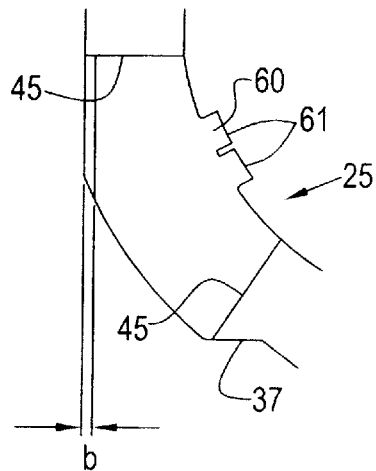

The outer surfaces of inserts 24, 25 are slightly depressed relative to the adjacent outer surface of the respective web 34, 35 by distances "a" and "b" as shown in FIGS. 6 and 7.

During assembly of the printer/plotter, the liner 20 is inserted longitudinally in the aperture or socket 14 from one end and secured in position. Liner 20 is then moved longitudinally over the rod 12 from one end. End stop means are positioned to allow the carriage, mounted on liner 20, to slide in a reciprocating manner between them. During such movement, the sole points of support of the carriage are the top surfaces 61 of the ribs 60.

Figure 13:
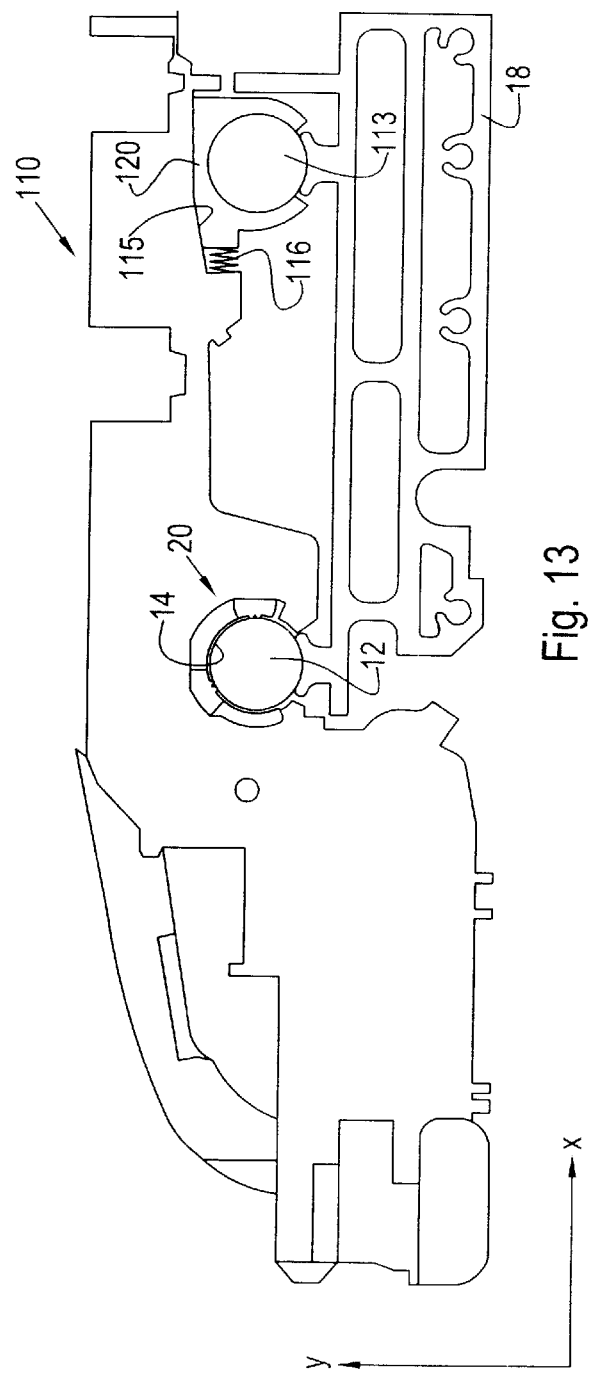
FIG. 13 shows a sectional view of a plotter carriage in accordance with a second embodiment of the present invention.

FIG. 13 shows a printer carriage 110 for sliding movement on sliding rods 12,113 attached to the main frame 18 of a printer.

The carriage defines a front aperture 14 which is arranged to receive a bushing liner 20 in accordance with the present invention and a rear mounting 115 which is arranged to receive a conventional bushing liner 120. Forces $F_1$ and $F_2$ arise at the points of contact of bushing 20 and forces $F_3$ and $F_4$ arise at the points of contact of bushing 120.

As is conventional, a preload spring 116 is provided between the carriage 110 and the rear bushing 120. The main purpose of this spring is to produce a horizontal force $F_p$ in the x-direction which reduces the tendency of the carriage to turn around a vertical axis (i.e. the y-direction).

The above described arrangements have numerous advantages. Only plastics material is in contact with rod 12, which provides a bearing with very low friction. Selection of the precise dimensions and locations of the ribs enables support to be provided at exactly the required locations. This has an advantage over arrangements in which the rod is engaged by flat surfaces or lands of the inside surface of the bushing liner as disclosed in U.S. Pat. No. 5,332,321 because the precise positions of contact can be determined leading to increased accuracy and less vibration.

The behaviour of the bearing is assisted by the definite location of the dimensionally-stable metallic parts of the liner 20 in aperture 14. The precise dimensioning of the metallic parts of the liner 20 and the accurate interference fit with aperture 14 makes the assembly reliable. The rigidity of the metallic parts resists large forces arising at the positions of contact, so there are no deformations and no adverse effects on print quality. However, because only plastics parts are in contact with rod 12, the arrangement is very quiet.

The selection of the angle, which is subtended at the centre of the slider rod by the lines passing through the positions of contact of the inserts, has the advantage of meeting the requirements set by the numerous loads imposed on the carriage mounting.

For example, in the carriage of FIG. 13, both static and dynamic forces need to be considered. As static forces one needs to take into account the weight of the carriage and the printhead and any other components moving rigidly therewith, the forces applied by any ink supply tubes attached to the printhead, and the effect of preload spring 116. With movement and acceleration of the carriage, the force system is complicated by the various inertia forces. It is the purpose of the points of contact of the bushing liners to make the system as stable as possible at all times. Among the dynamic forces to be taken into account are the frictional forces and the moments applied by the ink supply tubes and the frictional forces with relation to the slider rods (and directed perpendicular to the paper). There is also the tendency, mentioned above, for the carriage to turn around the y-direction. Although the preload spring 116 can counter this tendency, excessive frictional forces can arise at the rear bushing.

By making the angle between the points of contact of the bushing 20 different from 90° it is possible for the force $F_2$ to have a component in the horizontal direction (i.e. along the X-axis) to introduce the same stabilising effect as the preload spring, but without additional friction effects at the rear bushing. The angle between the points of contact is preferably within the range 100° to 165° and more preferably in the range 110° to 130°. This way of achieving stability is safer and more flexible than using spring 116 alone. Similar considerations apply in relation to carriages having a single slider rod, as in FIG. 1.

Various modifications can be made to the above-described arrangements. In particular the size, location and number of the plastics inserts may be selected as desired. In particular there may be a single extended plastics insert with two spaced pairs of ribs 60 forming the positions of contact with the rod 12. If desired, the plastics material may cover the entire inside surface of the metal material.

In addition, the number, size, separation and location of the ribs 60 on the or each insert may be selected as desired. Preferably, each insert has two, three or four ribs. Also, the length of one or more of the ribs may be less than the length "1" of the liner. Some or all of the ribs may extend in a circumferential direction. If desired, the ribs may be omitted completely, in which case the entirety of the slightly raised internal surface of the or each insert contacts the rod 12.

The inserts 24, 25 may extend through the thickness of the liner 20 to any desired extent, from only a small proportion to substantially the entire thickness thereof.

The external shape of the liner may be part-circular, polygonal or any suitable combination of curved and straight sections.

The inserts may be pre-moulded and then placed in position rather than being injection moulded in situ.

Stainless steel is the preferred material for body 21 in view of its high resistance to deformation. However, bronze or other metals may be used if desired.

The printer carriage can be supported by one or more bushing liners 20 as required and the length "1" of each liner will be determined by the load to be carried. As shown in FIG. 13, for certain printers and plotters a plurality of slider rods 12 are provided, each with one or more liners 20.

An extra bushing housing may be provided between the printer carriage 10 and the or each liner 20.

In an alternative arrangement, grooves may be provided directly in the walls of aperture 14 of the printer carriage, with the plastics inserts then being located in these grooves. However, this would lose the advantage of being able to select a material (for body 21) other than the material of the printer carriage.

In the embodiment of FIG. 13, the rear bushing 120 may be in accordance with the present invention instead of, or in addition to, the front bushing. Also, the direction of the forces arising may be arranged so that the preload spring 116 can be omitted.

What is claimed is:

1. A printer/plotter apparatus comprising a carriage mounted in an ink jet printer for horizontal sliding movement on at least one rod, the carriage mounting on the at least one rod comprising at least one bushing which is of generally part-annular cross-section and which comprises a rigid material, wherein the bushing further comprises one or more portions of a lubricious material that is different from the rigid material, at least one of the portions of lubricious material forms at least part of an internal surface of the bushing, wherein the internal surface of the bushing comprises rib means for contacting the at least one rod, wherein the rib means comprise one or more circumferentially-spaced sets of ribs extending axially along the at least one rod.

2. The printer/plotter apparatus of claim 1 wherein said carriage is biased against one or more of said one or more portions of a lubricious material.

3. A bushing liner for mounting a printer carriage in an ink jet printer for horizontal sliding movement on at least one rod, said bushing liner having a generally part-annular cross-section and comprising a rigid material, wherein the bushing liner further comprises one or more portions of lubricious material that is different from the rigid material, at least one of the portions of lubricious material forms at least part of an internal surface of the bushing liner, wherein the internal surface of the bushing liner comprises rib means for contacting the at least one rod, wherein the rib means comprise one or more circumferentially-spaced sets of ribs extending axially along the at least one rod.

4. A bushing liner according to claim 3, wherein said at least part of an internal surface of the bushing liner formed from said lubricious material protrudes beyond an internal surface of said rigid material.

5. A bushing liner according to claim 3, wherein said at least part of an internal surface of the bushing liner formed from said lubricious material comprises one or more ribs.

6. The bushing liner of claim 3, wherein said rib means defines two circumferentially-spaced positions for contact with the rod, wherein the positions subtend an angle of between 110° and 130°.

7. A bushing liner according to claim 3 wherein said one or more portions of lubricious material comprise two contact points for contacting said rod.

8. A bushing liner according to claim 3, wherein an external surface of the bushing liner comprises a plurality of flat and/or curved sections arranged in an asymmetrical manner.

9. A bushing liner according to claim 3, wherein the rigid material is a metallic material and the lubricious material is a plastics material.

10. A bushing liner according to claim 9, wherein the plastics material is applied to the metallic material in an injection moulding process, the metallic material having grooves which are shaped to retain the plastics material after injection.

11. A bushing liner according to claim 10, wherein the grooves incorporate dovetail-shaped recesses.

12. A bushing liner according to claim 10, wherein said at least part of an internal surface of the bushing liner formed from said lubricious material is located wholly within a flat section of the bushing liner, wherein the side surfaces of the respective groove are of concave shape.

13. A bushing for sliding on a carriage slider rod of a printer and having a generally part-annular construction wherein an internal surface of the bushing comprises rib means for contacting the slider rod, wherein the rib means comprise a plurality of circumferentially-spaced sets of ribs extending axially along the rod, wherein each of said plurality of circumferentially-spaced sets comprises two to four circumferentially-spaced ribs in close proximity to each other.

* * * * *